United States Patent
Chen et al.

(10) Patent No.: US 9,326,199 B2
(45) Date of Patent: Apr. 26, 2016

(54) METHODS FOR AUTONOMOUS FAST RETURN TO PREFERRED RAT AND COMMUNICATIONS APPARATUSES UTILIZING THE SAME

(71) Applicant: MediaTek Inc., Hsin-Chu (TW)

(72) Inventors: Hung-Yueh Chen, Taipei (TW); Chi-Chen Lee, Taipei (TW); Chih-Yuan Tsai, New Taipei (TW); Chun-Pin Chen, Taoyuan (TW); Yen-Cheng Lai, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 96 days.

(21) Appl. No.: 14/037,885

(22) Filed: Sep. 26, 2013

(65) Prior Publication Data

US 2014/0106751 A1 Apr. 17, 2014

Related U.S. Application Data

(60) Provisional application No. 61/712,327, filed on Oct. 11, 2012.

(51) Int. Cl.
*H04W 36/00* (2009.01)
*H04W 72/00* (2009.01)
*H04W 4/00* (2009.01)

(52) U.S. Cl.
CPC ...... *H04W 36/0066* (2013.01); *H04W 36/0022* (2013.01)

(58) Field of Classification Search
CPC . H04W 36/14; H04W 36/0022; H04W 36/30; H04W 36/18
USPC ........... 455/436, 438, 439, 443, 453; 370/311
See application file for complete search history.

(56) References Cited

U.S. PATENT DOCUMENTS

| 8,331,256 B2* | 12/2012 | Lee | H04W 36/0088 370/252 |
|---|---|---|---|
| 2009/0280812 A1* | 11/2009 | Cheng | H04W 76/046 455/436 |
| 2010/0113010 A1* | 5/2010 | Tenny | H04L 12/66 455/423 |
| 2010/0202307 A1* | 8/2010 | Lee | H04W 36/0088 370/252 |
| 2011/0021158 A1* | 1/2011 | Xing | H04W 36/30 455/68 |
| 2011/0263255 A1* | 10/2011 | Alonso-Rubio | H04W 36/0005 455/436 |
| 2012/0184276 A1* | 7/2012 | Pichna | H04W 36/0083 455/436 |
| 2013/0028187 A1* | 1/2013 | Aoyagi | H04W 36/0005 370/328 |
| 2013/0034080 A1* | 2/2013 | Yang | H04W 36/0055 370/331 |
| 2013/0136115 A1* | 5/2013 | Moisanen | H04W 76/027 370/338 |

(Continued)

*Primary Examiner* — Dung Hong
(74) *Attorney, Agent, or Firm* — McClure, Qualey & Rodack, LLP

(57) ABSTRACT

A communications apparatus includes an RF signal processing device, a baseband signal processing device and a processor. The processor controls operations of the RF signal processing device and the baseband signal processing device, camps on a first cell of a first RAT, collects cell selection/reselection parameters of one or more frequencies of the first RAT in an autonomous fast return (AFR) list, switches from the first RAT to the second RAT to camp on a second cell of the second RAT, establishes a connection with a peer communications apparatus via the second cell, receives a connection release message or a channel release message from the second cell to release the connection, and switches from the second RAT to the first RAT by performing a cell selection procedure or a redirection procedure according to the AFR list to camp on a third cell of the first RAT.

20 Claims, 5 Drawing Sheets

(56) References Cited

U.S. PATENT DOCUMENTS

| | | | | |
|---|---|---|---|---|
| 2013/0260765 A1* | 10/2013 | Aoyagi | ............ | H04W 36/0022 455/436 |
| 2014/0146792 A1* | 5/2014 | Andre-Jonsson | . | H04W 36/0022 370/331 |
| 2014/0155065 A1* | 6/2014 | Centonza | .......... | H04W 36/0066 455/436 |

* cited by examiner

| Number | Parameter | Source |
|--------|-----------|--------|
| 100 | Parameters from network | 4G cell |
| 200 | Parameters with default values | 2G/3G cell |
| .... | .... | .... |

FIG. 3

US 9,326,199 B2

METHODS FOR AUTONOMOUS FAST RETURN TO PREFERRED RAT AND COMMUNICATIONS APPARATUSES UTILIZING THE SAME

CROSS REFERENCE TO RELATED APPLICATIONS

This application claims the benefit of U.S. Provisional Application No. 61/712,327 filed Oct. 11, 2012 and entitled "CSFB Rapid Return", the entire contents of which are hereby incorporated by reference.

BACKGROUND OF THE INVENTION

1. Field of the Invention

The invention relates to communications apparatuses and methods for the communications apparatuses to autonomous fast return to a preferred RAT (Radio Access Technology).

2. Description of the Related Art

The evolution of wireless communications technologies often requires that newer systems and networks be compatible with existing systems and networks. A communications specification defining the operation of new technology often provides requirements for the new system to interface with these legacy systems. For example, the 3GPP Long Term Evolution (LTE) standard requires that a wireless communications device be able to use circuit switched networks for voice calls as well as utilize the LTE network. For example, LTE allows a circuit switched fall back (CSFB) procedure, in which an LTE handset can leverage the existing infrastructure of previous 2G or 3G technologies to make or receive voice calls. In other words, the LTE handset can end an existing LTE connection with an LTE evolved Node B (eNB) and fall back to a 2G or 3G cell (e.g., Node B or base station). During the CSFB procedure, the LTE session is suspended. Upon completion of the call, the LTE handset can then re-establish a connection with the LTE network. For another example, some operators may require a wireless communications device to be able to transfer a circuit switched service from a 3G network to a 2G network due to the 3G network not being as widely distributed as the 2G network or the 3G network being configured to only provide packet switched services.

When switching between different radio access technologies (RATs) is required, for example, switching from 4G to 3G/2G or switching from 3G to 2G as the examples given above, long delay time usually occurs. A long delay time can be frustrating for the user and can degrade the overall communications performance.

Therefore, a method for autonomous fast return to the original RAT is proposed.

BRIEF SUMMARY OF THE INVENTION

Communications apparatuses and methods for a communications apparatus in a network environment comprising a plurality of cells belonging to different RATs to autonomous fast return to a preferred RAT are provided. An embodiment of a communications apparatus comprises a radio frequency (RF) signal processing device, a baseband signal processing device and a processor. The RF signal processing device processes a plurality of RF signals to generate a plurality of baseband signals. The baseband signal processing device processes the baseband signals. The processor controls operations of the RF signal processing device and the baseband signal processing device, camps on a first cell of a first RAT, collects cell selection/reselection parameters of one or more frequencies of the first RAT in an autonomous fast return (AFR) list, switches from the first RAT to the second RAT to camp on a second cell of the second RAT, establishes a connection with a peer communications apparatus via the second cell, receives a connection release message or a channel release message from the second cell to release the connection, and switches from the second RAT to the first RAT by performing a cell selection procedure or a redirection procedure according to the AFR list to camp on a third cell of the first RAT.

An embodiment of a method for a communications apparatus in a network environment comprising a plurality of cells belonging to different RATs to autonomous fast return to a preferred RAT comprises: camping on a first cell of a first RAT; collecting cell selection/reselection parameters of one or more frequencies of the first RAT in an autonomous fast return (AFR) list; switching from the first RAT to the second RAT to camp on a second cell of the second RAT; establishing a connection with a peer communications apparatus via the second cell; receiving a connection release message or a channel release message from the second cell to release the connection; and switching from the second RAT to the first RAT by performing a cell selection procedure or a redirection procedure according to the AFR list to camp on a third cell of the first RAT.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 3 shows a table storing an exemplary AFR list according to an embodiment of the invention;

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
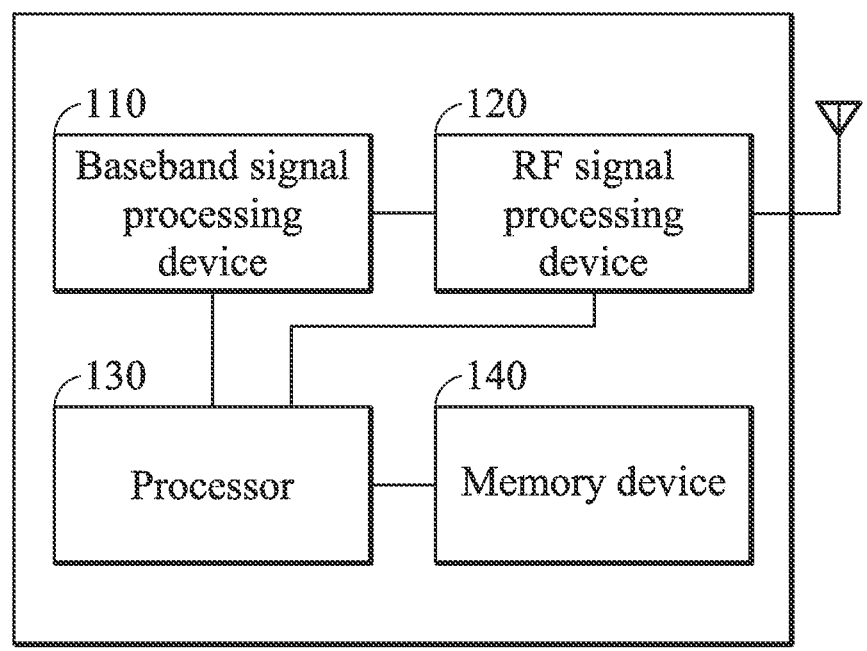
FIG. 1 shows a block diagram of a communications apparatus according to an embodiment of the invention.

FIG. 1 shows a block diagram of a communications apparatus according to an embodiment of the invention. The communications apparatus 100 may be a notebook, a cellular phone, a portable gaming device, a portable multimedia player, a Global Positioning System (GPS), a receiver, a personal digital assistant, a tablet computer, or another such device. The communications apparatus 100 may comprise at least a baseband signal processing device 110, a radio frequency (RF) signal processing device 120, a processor 130, a memory device 140, and an antenna module comprising at least one antenna. Note that, in order to clarify the concept of the invention, FIG. 1 presents a simplified block diagram in which only the elements relevant to the invention are shown. However, the invention should not be limited to what is shown in FIG. 1.

The RF signal processing device 120 may receive RF signals via the antenna and process the received RF signals to convert the received RF signals to baseband signals to be processed by the baseband signal processing device 110, or receive baseband signals from the baseband signal processing device 110 and convert the received baseband signals to RF signals to be transmitted to a peer communications apparatus. The RF signal processing device 120 may comprise a plurality of hardware elements to perform radio frequency conversion. For example, the RF signal processing device 120 may comprise a power amplifier, a mixer, or others.

The baseband signal processing device 110 may further process the baseband signals to obtain information or data transmitted by the peer communications apparatus. The baseband signal processing device 110 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The processor 130 may control the operations of the baseband signal processing device 110 and the RF signal processing device 120. According to an embodiment of the invention, the processor 130 may also be arranged to execute the program codes of the software module(s) of the corresponding baseband signal processing device 110 and/or the RF signal processing device 120. The program codes accompanied with specific data in a data structure may also be referred to as a processor logic unit or a stack instance when being executed. Therefore, the processor 130 may be regarded as being comprised of a plurality of processor logic units, each for executing one or more specific functions or tasks of the corresponding software module(s). The memory device 140 may store the software and firmware program codes, system data, user data, etc. of the communications apparatus 100.

According to an embodiment of the invention, the RF signal processing device 120 and the baseband signal processing device 110 may be collectively regarded as a radio module capable of communicating with a wireless network to provide wireless communications services in compliance with a predetermined Radio Access Technology (RAT). Note that, in some embodiments of the invention, the communications apparatus 100 may further be extended to comprise more than one antenna and/or more than one radio module, and the invention should not be limited to what is shown in FIG. 1.

In addition, in some embodiments of the invention, the processor 130 may be configured inside of the baseband signal processing device 110, or the communications apparatus 100 may comprise another processor configured inside of the baseband signal processing device 110. Thus the invention should not be limited to the architecture as shown in FIG. 1.

According to an embodiment of the invention, the communications apparatus 100 may be in a network environment comprising a plurality of cells belonging to different radio access technologies (RATs). The communications apparatus 100 may give different priorities for different RATs to stay based on the communications performance or some limitations. For example, regarding the packet switched (PS) performance, the priority to stay for 3G may be higher than 2G, and the priority to stay for 4G may be higher than 3G. For another example, regarding the circuit switched (CS) performance, in case that either the communications apparatus 100 or the 4G network does not support the Voice over LTE (VoLTE), the priority to stay for 3G and 2G may be higher than 4G. For yet another example, regarding the limitations, when the communications apparatus 100 does not support VoLTE, the priority to stay for 3G and 2G may be higher than 4G for CS services. For still yet another example, the priority to stay for different RATs may also be determined by a user or by a manufacturer.

According to an embodiment, when the communications apparatus 100 is switching communications services between two different RATs, the one having a higher priority to stay may be regarded as a preferred RAT and the one having a lower priority to stay may be regarded as a less preferred RAT. Suppose that the communications apparatus 100 originally camps on a first cell of a first RAT, which may be a preferred RAT, and when required, switches its communications services to a second cell of a second RAT, which may be a less preferred RAT. As a connection established via the second cell of the second RAT is being released, important focus is placed on the method to return to the preferred RAT as early as possible. In the following paragraphs, methods for autonomous fast return to the preferred RAT will be introduced and discussed.

Figure 2:
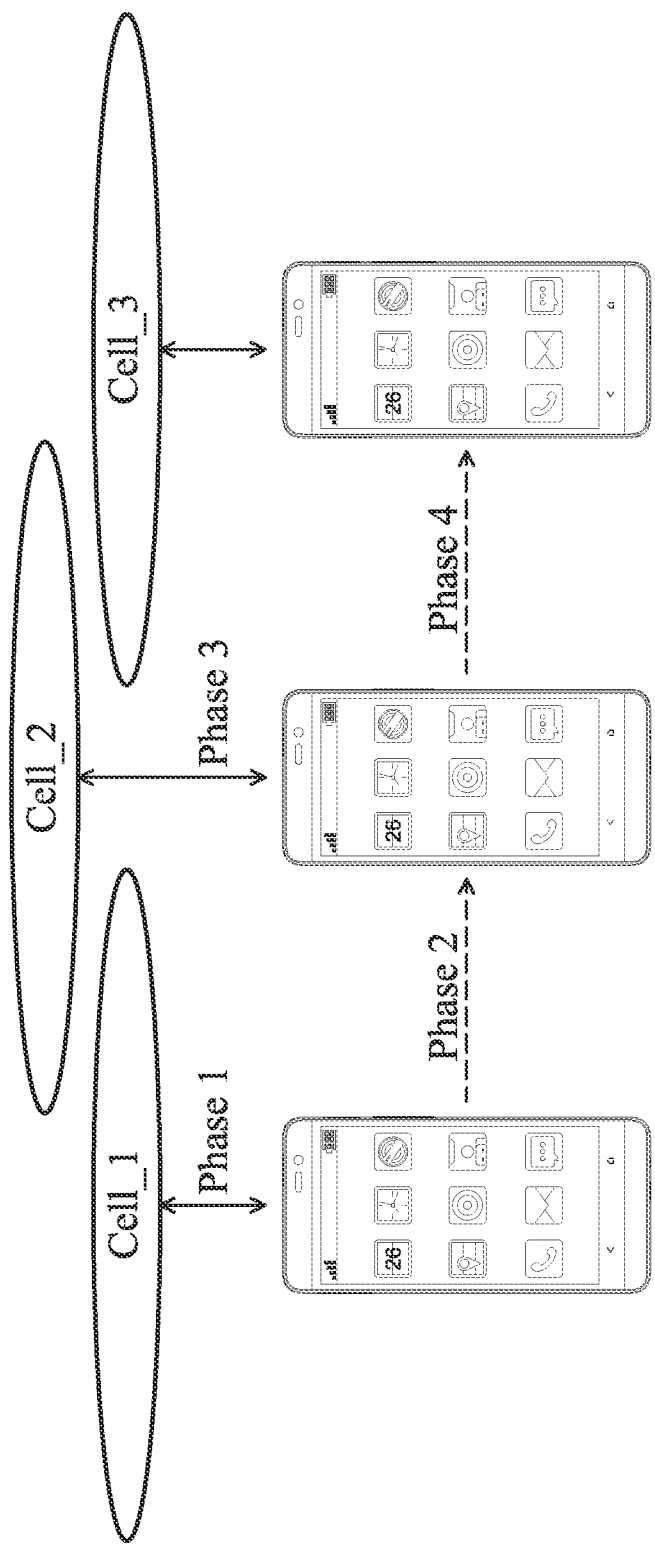
FIG. 2 is a schematic diagram showing the concept of inter-RAT switching according to an embodiment of the invention.

FIG. 2 is a schematic diagram showing the concept of inter-RAT switching according to an embodiment of the invention. In phase 1, the processor 130 of the communications apparatus 100 camps on a first cell Cell_1 of a first RAT. The processor 130 may maintain an autonomous fast return (AFR) list and collect cell selection and/or reselection parameters of one or more frequencies of the first RAT in the AFR list. According to an embodiment of the invention, the frequencies of the first RAT are the frequencies that the communications apparatus 100 can camp on. For example, the frequencies supported by the Public Land Mobile Network (PLMN) or the equivalent PLMN. The processor 130 may obtain the cell selection and/or reselection parameters of the one or more frequencies of the first RAT from one or more system information messages or dedicated messages received from the first cell Cell_1.

In phase 2, the processor 130 may switch from the first RAT to the second RAT to camp on a second cell Cell_2 of the second RAT. For example, suppose the first RAT is 4G and the second RAT is 2G or 3G, when the processor 130 has to establish a CS call, the processor 130 may perform a CSFB procedure to switch to a 2G or 3G network to camp on the second cell. For another example, suppose the first RAT is 3G and the second RAT is 2G, when the processor 130 has to establish a CS call based on 2G technology, the processor 130 may switch from a 3G network to a 2G network to camp on the second cell.

According to an embodiment of the invention, after camping on the second cell, the processor 130 may further obtain cell selection/reselection parameters of one or more frequencies of the first RAT from the second cell Cell_2 and collect the cell selection/reselection parameters obtained from the second cell Cell_2 in the AFR list. According to an embodiment of the invention, the processor 130 may obtain the cell selection and/or reselection parameters of the one or more frequencies of the first RAT from the neighboring frequency list or neighboring cell list provided by the second cell Cell_2 in the system information messages.

In phase 3, the processor 130 may establish a connection with a peer communications apparatus via the second cell Cell_2. When the connection is established, the communications apparatus 100 may operate in a dedicated mode or a dual transfer mode (DTM) when the second RAT is 2G, or in a connected mode when the second RAT is 3G or 4G. According to an embodiment of the invention, the processor 130 may also obtain cell selection and/or reselection parameters of one or more frequencies of the first RAT from dedicated messages received from the second cell Cell_2 and collect the cell selection/reselection parameters in the AFR list. The dedicated messages may be for example and not limited to, the measurement information message in 2G, the measurement control message in 3G or the RRCConnectionReconfiguration in 4G.

In addition, in phase 3, the processor 130 may measure one or more frequencies of the first RAT according to the content in the AFR list during a time interval when the connection exists. According to an embodiment, the processor 130 may use the gap (when the gap is provided) of the connection to perform the measurement. Note that in the embodiments of the invention, whether to perform the measurement in phase 3 is an optional choice.

In phase 4, the processor 130 may receive a connection release message or a channel release message from the second cell Cell_2 to release the connection. After the connection is released, the processor 130 may switch from the second RAT to the first RAT by performing a cell selection procedure or a redirection procedure according to the AFR list to camp on a third cell Cell_3 of the first RAT. According to an embodiment of the invention, the first cell Cell_1 and the third cell Cell_3 may be the same or different cell.

According to an embodiment of the invention, when the redirection information is not provided in the connection release message or the channel release message, the processor 130 may perform the cell selection procedure based on the one or more frequencies in the AFR list. For example, in the embodiments of the invention, the processor 130 may perform the cell selection procedure based on the one or more frequencies in the AFR list as in the following steps:

Step 1: The processor 130 may perform the cell selection procedure on one or more frequencies in the AFR list which have at least one cell that has been measured in phase 3 and determined as a qualified cell. Note that the qualified cell is a cell having a signal quality better than some predetermined criteria. The criteria may be the values indicated by the network or defined by the processor 130.

Step 2: In case step 1 fails (for example, there is no time to perform a measurement in phase 3, there is no qualified cell found in phase 3, or the processor 130 is unable to camp on a cell in step 1 due to that the system information cannot be entirely received or it is not allowed to camp on a cell, or other reasons), the processor 130 may perform the cell selection procedure on one or more frequencies in the AFR list which have not been measured in phase 3.

Step 3: In case step 2 fails (for example, the processor 130 is unable to camp on a cell in step 2 due to some reasons as discussed above), the processor 130 may perform the cell selection procedure on one or more frequencies of the first RAT but not listed in the AFR list. For example, the processor 130 may perform a frequency scan in the supported bands so as to find out supported frequencies.

Step 4: In case step 3 fails (for example, the processor 130 is unable to camp on a cell in step 3 since no other frequency of the first RAT can be found or due to some reasons as discussed above) or when a redirection timer set up by the processor 130 expires, the processor 130 may first return to an idle mode and still camp on a cell of the second RAT, and then may perform reselection to a cell of the first RAT according to a general cell reselection procedure.

Note that conventionally, when the redirection information is not provided in the connection release message or the channel release message, it implies that the network wants the communications apparatus 100 to first camp on a cell of the second RAT, and then perform a general cell reselection procedure to perform reselection to another cell just like step 4. However, the general cell reselection procedure is a time consuming procedure since the communications apparatus 100 has to perform measurement to find out a target cell and receive all required system information from the target cell. Different from the conventional designs, in the embodiments of the invention, when the AFR list is applied in step 1 and step 2 as discussed above, the communications apparatus 100 may directly camp on a suitable cell of the first RAT by utilizing the AFR list without camping on a cell of the second RAT and then changing to a cell of the first RAT by cell reselection procedure. Therefore, the use of the AFR list can facilitate the communications apparatus 100 to return to the first RAT as early as possible. Note that since the cell selection parameters and cell reselection parameters can both be recorded in the AFR list, when the recorded cell selection parameters are not sufficient to perform the cell selection procedure, the communications apparatus 100 may directly use the cell reselection parameters in the cell selection procedure.

On the other hand, when redirection information is provided in the connection release message or the channel release message, the processor 130 may perform the redirection procedure based on a frequency scan sequence carried in the redirection information and the AFR list. According to an embodiment of the invention, the processor 130 may prioritizes one or more frequencies in the frequency scan sequence provided by the network based on content in the AFR list and/or measurement result(s) of the one or more frequencies in the AFR list obtained in phase 3.

For example, the frequency (or frequencies) in the frequency scan sequence having at least one qualified cell of the first RAT may be given a highest priority (P1). The remaining frequency (or frequencies) in the frequency scan sequence may be given a secondary high priority (P2). The frequency (or frequencies) not in the frequency scan sequence but having at least one qualified cell of the first RAT may be given a third high priority (P3). The frequency (or frequencies) not in the frequency scan sequence but in the AFR list may be given a fourth high priority (P4). The frequency (or frequencies) not in the frequency scan sequence but belonging to the first RAT may be given a fifth high priority (P5). Note that the prioritization algorithm as discussed above is merely one of various embodiments of the invention, and the invention should not be limited thereto.

According to an embodiment of the invention, the measurement procedure in phase 3 may be optionally performed based on some criteria as will be discussed below (for example, the criteria 1-5 and/or others), and the AFR list maintenance (that is, collecting the cell selection/reselection parameters obtained in phase 3 in the AFR list) and the application of the AFR list in phase 4 may be optionally performed based on some criteria as will be discussed below (for example, the criteria 1-4 and/or others).

Criterion 1: The processor 130 may refer to a bit or a flag which is stored in the memory device 140 of the communications apparatus 100 and is configured by the user, the manufacturer or the network operator.

Criterion 2: The processor 130 may refer to a bit or a flag which is broadcasted or dedicatedly transmitted to the communications apparatus 100 by the network. For example, the corresponding procedure may be executed when the network indicates a permission in the system information message or a dedicated message (e.g., RRCConnectionReconfiguration or RRC CONNECTION RELEASE).

Criterion 3: The processor 130 may check if the PLMN of the first RAT is in a white list or a black list. The lists may be either updated by the processor 130 according to historical information or configured by the user, the manufacturer, or the network operator. For example, the procedure may be executed if the PLMN is in the white list, and the procedure may not be executed if the PLMN is in the black list. Note that the PLMN in Criterion 3 may also be replaced by the location area (LA), the routing area (RA) or the tracking area (TA), and the invention should not be limited thereto.

Criterion 4: The processor 130 may check a mobility of the communications apparatus 100 (e.g., the mobility may be determined based on a number of cell changes per unit time) or geographic information of the communications apparatus 100. For example, the procedure may not be executed when the number of cell changes per unit time exceeds a predefined threshold. The procedure may be executed or not executed if the processor 130 is in a predefined area.

Criterion 5: The processor 130 may check a measurement configuration set by the network. For example, the measurement may not be executed if the 3G/4G network did not configure any gap. For another example, the 4G measurement may not be executed if the 3G measurement is configured but the 4G measurement is not configured by the 2G network.

FIG. 3 shows a table storing an exemplary AFR list according to an embodiment of the invention. According to an embodiment of the invention, the AFR list may comprise information regarding a radio frequency carrier number of the one or more frequencies (such as the Number field as shown), the cell selection/reselection parameters of the one or more frequencies (such as the Parameter field as shown) and a source cell from which the cell selection/reselection parameters of the one or more frequencies are received (such as the Source field as shown). Note that in some embodiments, the source field may be omitted.

The radio frequency carrier number may be the Absolute Radio Frequency Carrier Number (ARFCN) for 2G, UTRA Absolute Radio Frequency Channel Number (UARFCN) for 3G, EUTRA Absolute Radio Frequency Channel Number (EARFCN) for 4G, or others.

The cell selection/reselection parameters may record the parameters obtained from the network or the parameters with default values. For example, the cell selection/reselection parameters may comprise the Qrxlevelmin, Qqualmin, Pcompensation, etc. When the parameters are not provided by the network or the communications apparatus 100 is unable to receive the parameters from the network, the processor 130 may also store default values which are determined or based on historically received parameters in the AFR list.

According to an embodiment of the invention, when the number of entries in the AFR list exceeds a predetermined threshold, the processor 130 may prioritize the frequencies in the AFR list according to the source cell, such that the some frequencies may be discarded. For example, the frequencies received from a current or most recent serving cell may be given a higher priority than the frequencies received from a previous serving cell.

According to another embodiment of the invention, when the number of entries in the AFR list exceeds a predetermined threshold, the processor 130 may also prioritize the frequencies in the AFR list based on the parameters. For example, the frequencies with cell selection/reselection parameters received from the network may be given a higher priority than the frequencies without the cell selection/reselection parameters received from the network.

Note that according to still another embodiment of the invention, the stored list as defined in the communications standards for recording a list of received frequencies may also be directly applied as the AFR list. In addition, in some embodiments, when the stored list is applied as the AFR list, the processor 130 may further collect the cell selection/reselection parameters of the frequencies in the stored list and, optionally, a source cell from which the cell selection/reselection parameters of the frequencies in the stored list are received as discussed above in the AFR list, so as to establish an AFR list comprising more useful information based on the stored list. Therefore, the AFR list may be regarded as an enhanced stored list. The content in the AFR list may be updated when receiving new frequency or new neighbor cell list from the network. The newly received frequency may be added in the AFR list. When the number of entries in the AFR list exceeds a predetermined threshold, the processor 130 may discard some records as discussed above, or directly replace the old records by the records of the newly received frequencies.

Figure 4:
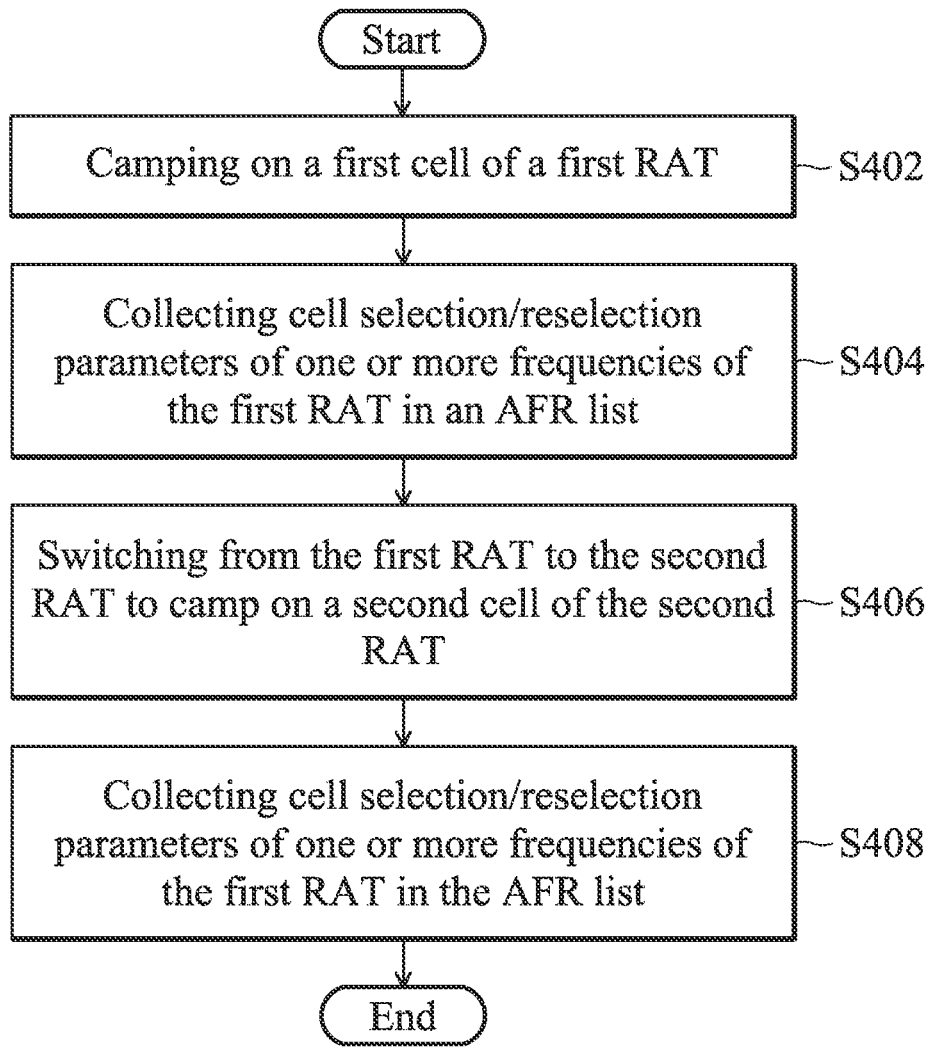
FIG. 4 shows a flow chart of a method for building up an AFR list according to an embodiment of the invention.

FIG. 4 shows a flow chart of a method for building up an AFR list according to an embodiment of the invention. First of all, the communications apparatus 100 may camp on a first cell of a first RAT (Step S402). Next, the processor 130 of the communications apparatus 100 may collect cell selection/reselection parameters of one or more frequencies of the first RAT in an AFR list (Step S404). Note that in some embodiments of the invention, the processor 130 may also not add the cell selection/reselection parameters in the AFR list, and the invention should not be limited thereto. In step S404, information regarding the frequencies of the first RAT and the corresponding cell selection/reselection parameters may be obtained from system information messages, dedicated messages or other message sent by the first cell.

Next, the processor 130 may switch from the first RAT to the second RAT to camp on a second cell of the second RAT (Step S406). Finally, the processor 130 may collect cell selection/reselection parameters of one or more frequencies of the first RAT in an AFR list (Step S408). Note that in some embodiments of the invention, the processor 130 may also not add the cell selection/reselection parameters in the AFR list, and the invention should not be limited thereto. In step S408, information regarding the frequencies of the first RAT and the corresponding cell selection/reselection parameters may be obtained from system information messages, dedicated messages or other message sent by the second cell.

Figure 5:
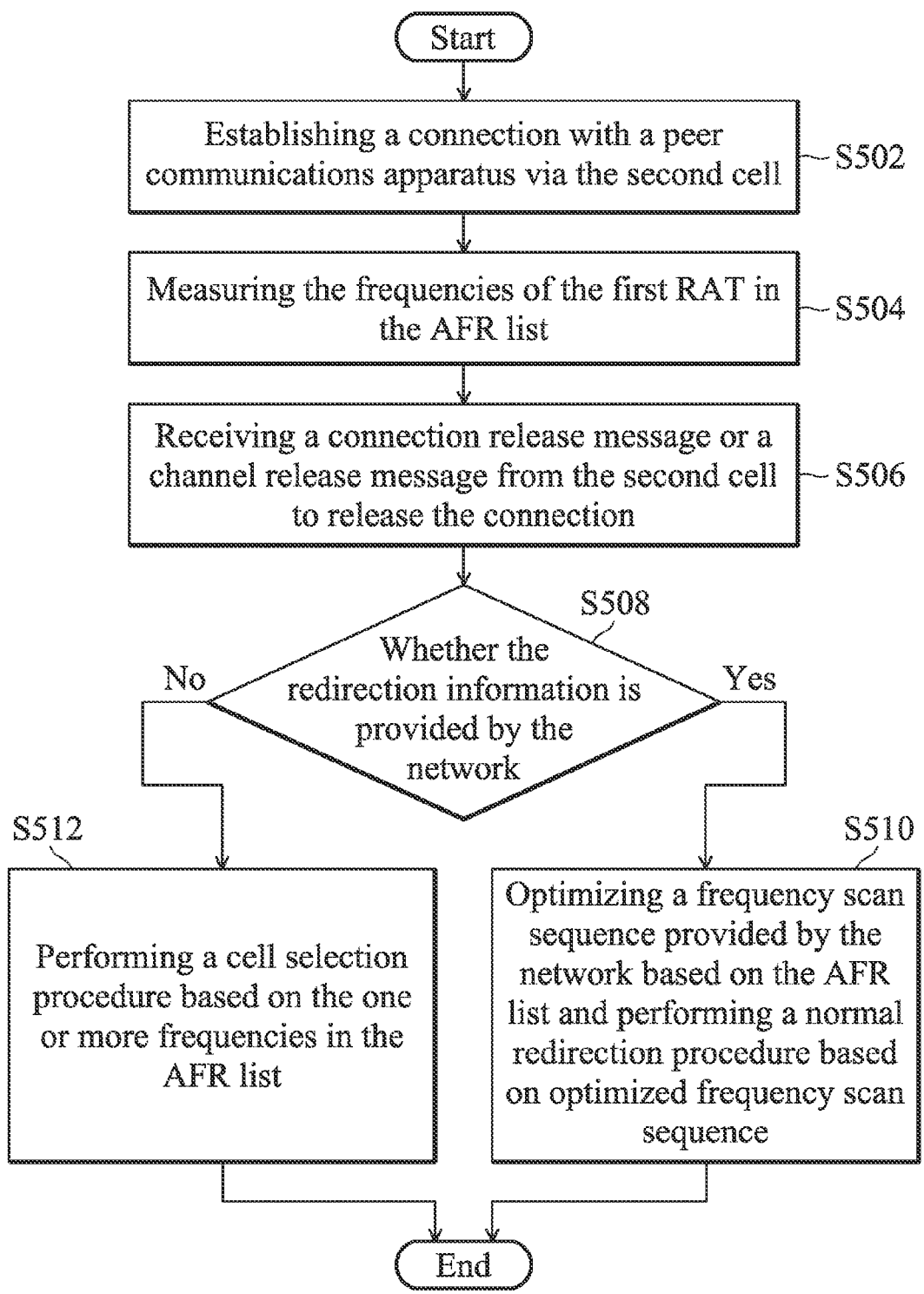
FIG. 5 shows a flow chart of a method for a communications apparatus in a network environment comprising multiple cells belonging to different RATs to autonomous fast return to a preferred RAT according to an embodiment of the invention.

FIG. 5 shows a flow chart of a method for a communications apparatus in a network environment comprising multiple cells belonging to different RATs to autonomous fast return to a preferred RAT according to an embodiment of the invention. Suppose that the communications apparatus 100 currently camp on the second cell of the second RAT to establish a connection via the second cell, wherein the first RAT is a preferred RAT and the second RAT is a less preferred RAT. The processor 130 may first establish a connection with a peer communications apparatus via the second cell (Step S502). Next, the processor may measure the frequencies of the first RAT in the AFR list (Step S504). Note that in some embodiments of the invention, Step S504 may also be skipped.

Next, the processor may receive a connection release message or a channel release message from the second cell to release the connection (Step S506). Next, the processor 130 may determine whether the redirection information is provided by the network (Step S508). If so, the processor 130 may optimize a frequency scan sequence provided by the network in the redirection information based on the AFR list and perform a normal redirection procedure based on the optimized frequency scan sequence to camp on a third cell of the first RAT (Step S510). For example, the processor 130 may prioritize the frequency scan sequence based on the content in the AFR list as discussed above and/or the measurement result(s) of the one or more frequencies in the AFR list obtained in step S504.

If not, the processor 130 may perform a cell selection procedure based on the one or more frequencies in the AFR as the steps 1-4 discussed above to camp on a third cell of the first RAT (Step S512).

Note that as discussed above, a general cell reselection procedure is a time consuming procedure since the communications apparatus 100 has to perform a measurement to find out a target cell and receive all required system information from the target cell. In addition, sometimes the location area update (LAU), tracking area update (TAU), or routing area update (RAU) is further required when returning to a cell of the first RAT. However, different from the conventional designs, in the embodiments of the invention, when the AFR list is applied as discussed above, the communications apparatus 100 may directly camp on a suitable cell of the first RAT by utilizing AFR list without camping on a cell of the second RAT and then changing to a cell of the first RAT by cell reselection procedure. In addition, unnecessary LAU, TAU or RAU can be avoided. Therefore, the use of the AFR list can facilitate the communications apparatus 100 to return to the first RAT as early as possible.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The above-described embodiments of the present invention can be implemented in any of numerous ways. For example, the embodiments may be implemented using hardware, software, or a combination thereof. It should be appreciated that any component or collection of components that perform the functions described above can be generically considered as one or more processors that control the above-discussed function. The processor(s) can be implemented in numerous ways, such as with dedicated hardware, or with general-purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus in a network environment comprising a plurality of cells belonging to different radio access technologies (RATs), comprising:
    a radio frequency (RF) signal processing device, processing a plurality of RF signals to generate a plurality of baseband signals;
    a baseband signal processing device, processing the baseband signals; and
    a processor, for controlling operations of the RF signal processing device and the baseband signal processing device,
    wherein the processor further camps on a first cell of a first RAT, collects cell selection/reselection parameters of one or more frequencies of the first RAT in an autonomous fast return (AFR) list, switches from the first RAT to a second RAT to camp on a second cell of the second RAT, establishes a connection with a peer communications apparatus via the second cell, receives a connection release message or a channel release message from the second cell to release the connection, and determines whether to switch from the second RAT to the first RAT by performing a cell selection procedure or a redirection procedure according to the AFR list to camp on a third cell of the first RAT based on whether redirection information is provided in the connection release message or the channel release message.

2. The communications apparatus as claimed in claim 1, wherein the cell selection/reselection parameters of the one or more frequencies of the first RAT are obtained from one or more system information messages or dedicated messages received from the first cell.

3. The communications apparatus as claimed in claim 1, wherein after switching from the first RAT to the second RAT, the processor further obtains cell selection/reselection parameters of one or more frequencies of the first RAT from the second cell before the connection is established and collects the cell selection/reselection parameters obtained from the second cell in the AFR list.

4. The communications apparatus as claimed in claim 1, wherein after the connection is established, the processor further obtains cell selection/reselection parameters of one or more frequencies of the first RAT from the second cell and collects the cell selection/reselection parameters obtained from the second cell in the AFR list.

5. The communications apparatus as claimed in claim 1, wherein the processor further measures the one or more frequencies of the first RAT in the AFR list during a time interval when the connection exists.

6. The communications apparatus as claimed in claim 5, wherein when redirection information is not provided in the connection release message or the channel release message, the processor performs the cell selection procedure based on the one or more frequencies in the AFR list.

7. The communications apparatus as claimed in claim 5, wherein when the redirection information is not provided in the connection release message or the channel release message, the processor first performs the cell selection procedure on one or more frequencies in the AFR list which have at least one cell that has been measured and determined as a qualified cell.

8. The communications apparatus as claimed in claim 5, wherein when the redirection information is provided in the connection release message or the channel release message, the processor performs the redirection procedure based on a frequency scan sequence carried in the redirection information and the AFR list.

9. The communications apparatus as claimed in claim 8, wherein before performing the redirection procedure, the processor further prioritizes one or more frequencies in the frequency scan sequence based on content in the AFR list and/or measurement result(s) of the one or more frequencies in the AFR list.

10. The communications apparatus as claimed in claim 1, wherein the AFR list comprises information regarding a radio frequency carrier number of the one or more frequencies, the cell selection/reselection parameters of the one or more frequencies and a source cell from which the cell selection/reselection parameters of the one or more frequencies are received.

11. A method for a communications apparatus in a network environment comprising a plurality of cells belonging to different radio access technologies (RATs) to autonomous fast return to a preferred RAT, comprising:
- camping on a first cell of a first RAT;
- collecting cell selection/reselection parameters of one or more frequencies of the first RAT in an autonomous fast return (AFR) list;
- switching from the first RAT to a second RAT to camp on a second cell of the second RAT;
- establishing a connection with a peer communications apparatus via the second cell;
- receiving a connection release message or a channel release message from the second cell to release the connection; and
- determining whether to switch from the second RAT to the first RAT by performing a cell selection procedure or a redirection procedure according to the AFR list to camp on a third cell of the first RAT based on whether redirection information is provided in the connection release message or the channel release message.

12. The method as claimed in claim 11, wherein the cell selection/reselection parameters of the one or more frequencies of the first RAT are obtained from one or more system information messages or dedicated messages received from the first cell.

13. The method as claimed in claim 11, further comprising:
- obtaining cell selection/reselection parameters of one or more frequencies of the first RAT from the second cell after switching from the first RAT to the second RAT and before the connection is established; and
- collecting the cell selection/reselection parameters obtained from the second cell in the AFR list.

14. The method as claimed in claim 11, further comprising:
- obtaining cell selection/reselection parameters of one or more frequencies of the first RAT from the second cell after the connection is established; and
- collecting the cell selection/reselection parameters obtained from the second cell in the AFR list.

15. The method as claimed in claim 11, further comprising:
- measuring the one or more frequencies of the first RAT in the AFR list during a time interval when the connection exists.

16. The method as claimed in claim 15, wherein when redirection information is not provided in the connection release message or the channel release message, the cell selection procedure is performed based on the one or more frequencies in the AFR list.

17. The method as claimed in claim 15, wherein when the redirection information is not provided in the connection release message or the channel release message, the cell selection procedure is first performed on one or more frequencies in the AFR list which have at least one cell that has been measured and determined as a qualified cell.

18. The method as claimed in claim 15, wherein when the redirection information is provided in the connection release message or the channel release message, the redirection procedure is performed based on a frequency scan sequence carried in the redirection information and the AFR list.

19. The method as claimed in claim 18, further comprising:
- prioritizing one or more frequencies in the frequency scan sequence based on content in the AFR list and/or measurement result(s) of the one or more frequencies in the AFR list before performing the redirection procedure.

20. The method as claimed in claim 11, wherein the AFR list comprises information regarding a radio frequency carrier number of the one or more frequencies, the cell selection/reselection parameters of the one or more frequencies and a source cell from which the cell selection/reselection parameters of the one or more frequencies are received.

* * * * *